(12) United States Patent
Mellander

(10) Patent No.: US 6,820,347 B2
(45) Date of Patent: Nov. 23, 2004

(54) ELECTRONIC MICROMETER FOR SENSING THE DIAMETER OF A CYLINDRICAL BODY

(75) Inventor: William E. Mellander, Chesterton, IN (US)

(73) Assignee: Harford Industries, Inc., Chesterton, IN (US)

( * ) Notice: Subject to any disclaimer, the term of this patent is extended or adjusted under 35 U.S.C. 154(b) by 0 days.

(21) Appl. No.: 10/249,383

(22) Filed: Apr. 3, 2003

(65) Prior Publication Data

US 2003/0188446 A1 Oct. 9, 2003

Related U.S. Application Data

(60) Provisional application No. 60/369,389, filed on Apr. 3, 2002.

(51) Int. Cl.[7] .................................................. G01B 5/20
(52) U.S. Cl. ........................................ 33/555.1; 33/551
(58) Field of Search ............................... 33/555.1, 551, 33/552, 553, 554

(56) References Cited

U.S. PATENT DOCUMENTS

| | | | | | |
|---|---|---|---|---|---|
| 2,855,687 A | * | 10/1958 | Price | | 33/555.3 |
| 4,322,888 A | * | 4/1982 | Garzione | | 33/555.1 |
| 4,729,174 A | * | 3/1988 | Caron et al. | | 33/555.1 |
| 4,903,413 A | * | 2/1990 | Bellwood | | 33/551 |
| 4,949,468 A | * | 8/1990 | Kohler | | 33/555.1 |
| 4,958,442 A | * | 9/1990 | Eckhardt | | 33/555.1 |
| 5,052,121 A | * | 10/1991 | Wachtler | | 33/555.1 |
| 5,351,410 A | * | 10/1994 | Hainneville | | 33/555.1 |
| 5,535,143 A | * | 7/1996 | Face | | 33/551 |
| 6,079,113 A | * | 6/2000 | Helmrichs | | 33/555.1 |
| 2002/0050069 A1 | * | 5/2002 | Mellander | | 33/551 |

* cited by examiner

Primary Examiner—Christopher W. Fulton
Assistant Examiner—Madeline Gonzalez
(74) Attorney, Agent, or Firm—Gary M. Hartman; Domenica N. S. Hartman; Hartman & Hartman

(57) ABSTRACT

A freestanding micrometer and method for determining the diameter of a cylindrical body, including measuring variations in diameter along a longitudinal length thereof, such as a roll used in the production of metal and paper sheet products. The micrometer comprises a housing supported on a circumferential surface of the cylindrical body. A first sensing element is movably supported by the housing and adapted for sensing a first surface point of the cylindrical body laterally spaced apart from the housing and disposed in a cross-sectional plane of the cylindrical body. A second sensing element is mounted to the housing for contact with a second surface point of the cylindrical body disposed in the cross-sectional plane of the cylindrical body. The first and second surface points locate, respectively, a terminal and midpoint of a chord lying in the cross-section plane of the cylindrical body, from which the diameter of the cylindrical body is determined.

20 Claims, 1 Drawing Sheet

ELECTRONIC MICROMETER FOR SENSING THE DIAMETER OF A CYLINDRICAL BODY

CROSS REFERENCE TO RELATED APPLICATIONS

This application claims the benefit of U.S. Provisional Application No. 60/369,389, filed Apr. 3, 2002.

BACKGROUND OF INVENTION

1. Field of the Invention

The present invention generally relates to devices for measuring dimensions of a body. More particularly, this invention relates to devices for measuring the profile and/or diameter of a cylindrical body, such as a roll used in the production of sheet products.

2. Description of the Related Art

Cylindrical rolls used to roll sheet products, such as aluminum and paper, are required to have a particular profile in order to obtain a flat rolled product. For this reason, the contours or profiles of such rolls must be accurately measured and variations in diameters along their lengths recorded. Freestanding saddle-type micrometers have been widely used for this purpose.

As represented in U.S. Pat. No. 5,088,207 to Betsill et al., a freestanding saddle micrometer generally includes a saddle supported on wheels for rolling ("skating") along the longitudinal length of a roll. As used herein, the term "freestanding" is used in reference to a saddle-type micrometer in that such micrometers are not mounted to a grinder or other permanent apparatus, but instead are portable and placed on the roll being evaluated. The Betsill et al. saddle micrometer is a caliper-type unit, in that the micrometer has oppositely-disposed arms that extend outward and downward from the saddle so as to be located on opposite sides of a roll when the micrometer is placed on top of a roll. The arms are supported by a rocking crossbar. One of the arms supports a counterweight or follower probe, while the second arm carries an indicator probe, such as a dial indicator or an LVDT (linear variable differential transducer). By locating the follower and indicator probes on their respective arms to be diametrically opposite each other relative to the roll, variations in the diameter of the roll can be detected by skating the saddle along the length of the roll. If a dial indicator is used as the indicator probe, the saddle must make stops along the length of the roll to allow manual recording of the dial indicator reading. If an LVDT or other electronic transducer is used, variations in the roll diameter can be continuously recorded electronically. The saddle is preferably equipped with an encoder to measure the distance skated along the length of the roll, and a minicomputer is mounted on the frame to read, record, and present input data from the LVDT and the encoder.

Existing saddle micrometers have several shortcomings that involve compromises in weight, rigidity, balance and operation. In terms of weight and rigidity, existing saddle micrometers have taken two approaches: either ignore weight for the sake of rigidity, which results in a unit that operators find difficult to handle but will, provide accurate readings; or reduce weight to provide a unit that can be more easily handled, sacrificing rigidity to the extent that imprecise readings may occur. This problem is exacerbated if electronic probes are used, since the unit is constantly in motion as readings are taken. Nonetheless, lighter-weight units have generally been more widely accepted because of the difficulty in handling the heavier, more rigid units. Existing saddle micrometers are also generally top heavy, with the result that the units are more prone to slip off the top of a roll. In the event of slipping off a roll, if a heavier unit is used the unit will probably not be damaged but the operator is at risk of injury. On the other hand, if a lightweight unit slides off a roll, the unit is much more likely to be damaged.

Finally, from an operational standpoint, existing caliper-type micrometers do not actually measure roll diameter, but instead are limited to determining the profile of a roll, i.e., variations in diameter along the length of a roll. Furthermore, micrometers have relied on an onboard minicomputer to acquire and process the collected data. Because of the limited computing power of these minicomputers, many electronic saddle micrometers are a simple unit that is easy to learn and operate, but provides only basic profile information. More advanced units are available that require extensive training to learn and skill to operate. While providing more detailed profile information, roll history and hard copy printout, in practice such enhanced capabilities were rarely used because of the difficulty in learning how to operate the onboard minicomputer.

From the above, it can be seen that it would be desirable if a saddle micrometer were available that overcame the shortcomings of the prior art, including improved rigidity, balance and operational features without incurring excessive weight.

SUMMARY OF INVENTION

The present invention provides a freestanding micrometer and method for determining the diameter of a cylindrical body. The micrometer and method can be adapted to measure variations in diameter along a longitudinal length of a cylindrical body, such as a roll used in the production of metal and paper sheet products. The micrometer comprises a housing and means for supporting the housing on a surface of the cylindrical body while the cylindrical body is oriented so that its longitudinal axis is approximately horizontal. A first measurement means is movably supported by the housing so that the position of the first measurement means can be altered in a lateral direction that is approximately perpendicular to the longitudinal axis of the cylindrical body. The first measurement means is adapted for sensing a first surface point of the cylindrical body laterally spaced apart from the housing and disposed in a cross-sectional plane of the cylindrical body. The micrometer further comprises a second measurement means mounted to the housing for contact with a second surface point of the cylindrical body disposed in the cross-sectional plane of the cylindrical body. The first surface point defines a terminal of a chord lying in the cross-section plane of the cylindrical body, while the second surface point defines a location along the length of the chord. Finally, the micrometer is equipped with means for determining the diameter of the cylindrical body based on the length and height of the chord ascertained from first and second outputs of the first and second measurement means, respectively.

The freestanding micrometer described above makes possible a method of determining the diameter of a cylindrical body without diametrically-opposed sensing probes. According to the method, the housing is placed on the surface of the cylindrical body while the cylindrical body is oriented so that its longitudinal axis is approximately horizontal. The first measurement means is then positioned relative to the housing in a lateral direction approximately perpendicular to the longitudinal axis of the cylindrical body, and produces a first output signal by sensing a first surface point of the cylindrical body laterally spaced apart from the housing and disposed in a cross-sectional plane of the cylindrical body. A second output signal is produced with the second measurement means by sensing a second surface point of the cylindrical body adjacent the housing and disposed in the same cross-sectional plane of the cylindrical body as the first surface point. As such, the first and second surface points sensed by the first and second measurement means define, respectively, a chord terminal and a point along the length of the chord, and the diameter of the cylindrical body is determined based on the length and height of the chord ascertained from the first and second output signals.

In view of the above, it can be seen that the freestanding micrometer of this invention structurally differs from freestanding caliper-type saddle micrometers of the prior art by its capability to determine the diameter of a cylindrical body, instead of just the profile of the body. Furthermore, the micrometer is able to make use of a first sensing element spaced apart from the housing by a single arm, and a second sensing element carried close to or on the housing. Because of its compact construction, the micrometer of this invention can be constructed to be relatively lightweight, resulting in a unit that is easier and safer to use. In addition, the micrometer of this invention can be constructed to be rigid relative to its weight, resulting in more reliable and precise data acquisition.

Other objects and advantages of this invention will be better appreciated from the following detailed description.

DETAILED DESCRIPTION

Figure 1:
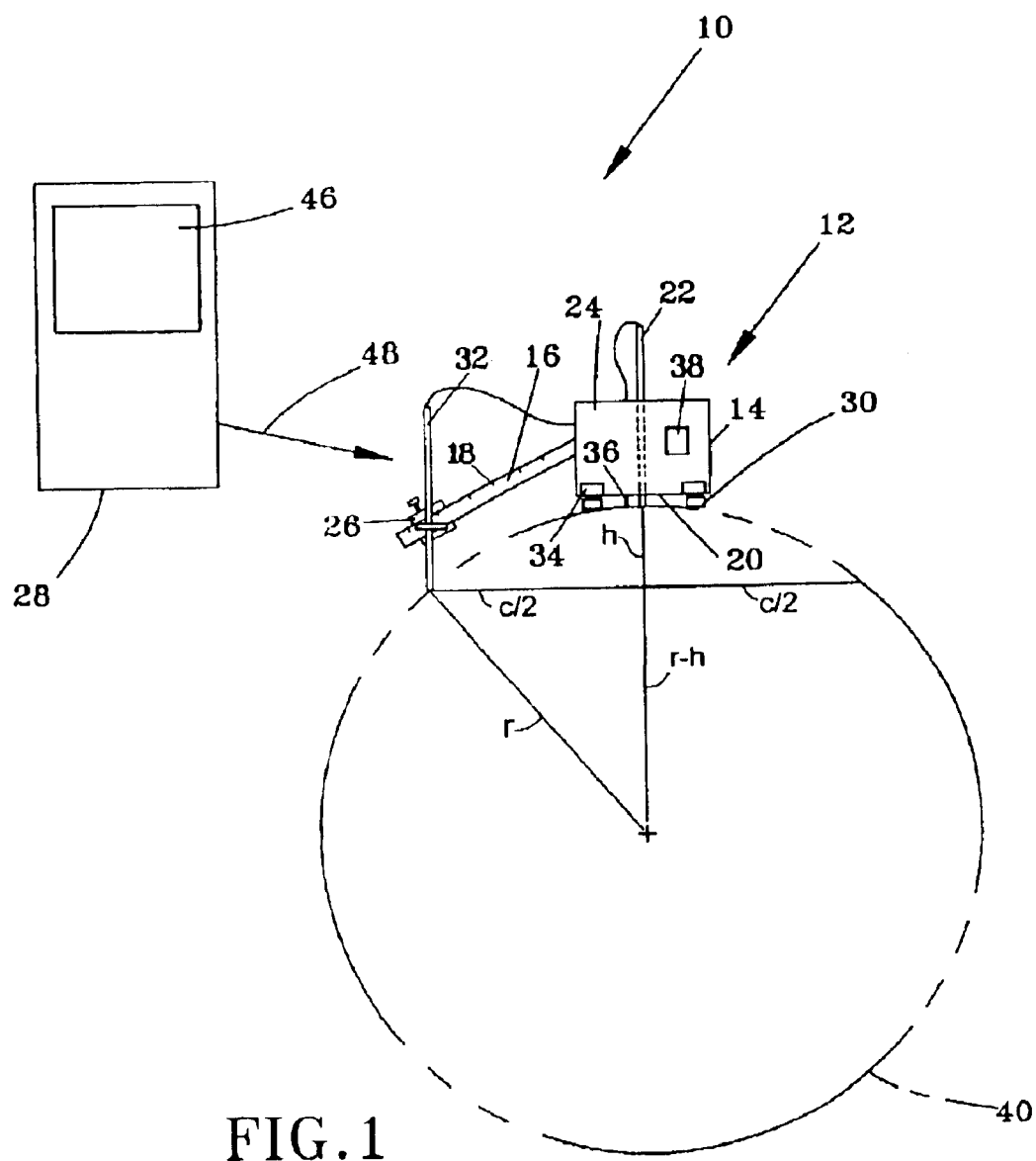
FIG. 1 represents an electronic micrometer system placed on a cylindrical body for sensing the diameter and diametrical variations of the body.

An electronic micrometer system 10 in accordance with an embodiment of this invention is shown in FIG. 1. The system 10 can be seen to comprise a portable unit 12 that includes a housing 14, an arm 16 extending from the housing 14, and a remote computer 28 such as a PC1. As seen in FIG. 1, the housing 14 has a floor 20 and sidewalls 24 that generally define a rectangular-shaped box. The housing 14 may be constructed of aluminum or another relatively lightweight but rigid structural material. The housing 14 is capable of being very compact, for example, lateral and longitudinal dimensions of about 6.75×8.25 inches (about 17×21 cm), with a weight of about eleven pounds (about 5 kg) or less.

The housing 14 is preferably equipped with four supports for supporting the housing 14 on the upper arcuate surface of a cylindrical roll 40, as depicted in FIG. 1. To enable the unit 12 to skate the roll 40 in order to measure variations in the diameter (i.e., profile) of the roll 40 along its length, the means of support are preferably wheels 30. The wheels 30 are shown as being rotatably supported by bearings 34 so that the axis of rotation of each wheel 30 is substantially vertical when supporting the housing 14, i.e., vertical to the floor 20 of the housing 14. This orientation allows for the use of wheels 30 of small diameter, which more positively position the housing 14 on the upper surface of the roll 40 and therefore promote the accuracy of the unit 12. As depicted, the wheels 30 are sufficiently small so that their diameters are less than the diameters of the bearings 34 supporting them. The housing 14 is preferably equipped with an encoder (not shown) to measure the distance traveled by the housing 14 via sensing rotation of one of the wheels 30. The housing 14, arm 16 and wheels 30 are preferably configured to allow the unit 12 to be used for a wide range of roll diameters.

The housing 14 is also shown as having a sensing element 22 mounted thereto for sensing the surface of the roll 40 beneath the housing 14. While shown as extending through the body of the housing 14, the sensing element 22 could be mounted externally to the housing 14. Suitable devices for the sensing element 22 include electronic linear measurement devices, such as an LVDT, which generate an electronic signal that accurately indicates displacement of a surface relative to the housing 14. The sensing element 22 is preferably oriented to be aligned with a radius of the roll 40, e.g., vertical when the housing 14 is positioned top-deadcenter on the roll 40.

The arm 16 is shown as extending from one of the sidewalls 24 of the housing 14, generally in a lateral and downward direction at an acute angle to the floor 20 of the housing 14. The arm 16 includes graduations 18 along its length, and a second sensing element 32 is adjustably mounted to the arm 16 with a bracket 26. As with the sensing element 22, a suitable device for the sensing element 32 mounted to the arm 16 is an LVDT or other electronic linear measurement device. The graduations 18 on the arm 16 enable the sensing element 32 to be precisely positioned relative to the housing 14, and therefore the sensing element 22. As seen in FIG. 1, the sensing elements 22 and 32 are preferably oriented to be substantially parallel to each other, so that they come into contact with surface points of the roll 40 as a result of being displaced in parallel directions, e.g., vertical as shown in FIG. 1. Furthermore, the sensing elements 22 and 32 are not positioned diametrically opposite each other relative to the roll 40. As represented in FIG. 1, the sensing element 22 is located at or near top-dead-center of the roll 40 while the sensing element 32 locates one terminal of a horizontal chord "c" of the roll 40, represented in FIG. 1 as the sum of two half-chords, each having a length of c/2. Because of the location of the sensing element 22 on the roll 40, the sensing element 22 (and the surface point it locates) is vertically aligned with the midpoint of the chord.

As evident from FIG. 1, the sensing elements 22 and 32 are adapted to make contact with points on the surface of the roll 40 that are circumferential spaced-apart, but lie in the same cross-sectional plane of the roll 40. The surface points contacted by the elements 22 and 32 are geometrically related by the chord length, a vertical radius and a second radius (r), which together define an angle as seen in FIG. 1. A portion of the length of the vertical radius lies between the chord and the surface point contacted by the sensing element 22, and is defined herein as the height (h) of the chord. Accordingly, the remaining portion of the vertical radius (between the chord and the longitudinal axis of the roll 40) has a length r-h. Based on the geometric relationship between the chord length (c) and chord height (h), the diameter of the roll 40 can be computed with the formula $$d = (c^2 + 4h^2)/4h$$

where d is the diameter of the cylindrical body.

The chord height is able to be effectively measured with the sensing elements 22 and 32 as a result of the sensing elements 22 and 32 moving in a parallel direction to contact the surface points lying in the same cross-sectional plane of the roll 40. For this purpose, the two sensing elements 22 and 32 are calibrated relative to each other with regard to their positions and measurement ranges. The chord length is twice the distance c/2, and therefore twice the lateral (horizontal) distance between the sensing elements 22 and 32. For this purpose, the chord half-length is physically established by accurately positioning the sensing element 32 along the length of the arm 16 with the graduations 18. The graduations 18 effectively serve as a chord scale that projects out over a circumferential portion of the roll 40 adjacent the housing 14. The graduations 18 define stops at which the movable sensing element 32 can be located relative to the sensing element 22. As such, the unit 12 is able to establish multiple chord lengths, such that a chord length can be established that, based on the size of the roll 40 being evaluated, will provide a measurable chord height sufficient to accurately calculate the roll diameter, e.g., with an accuracy having a range of about 0.015 inch (about 0.4 mm) or less, without the need for diametrically-opposed sensors. As depicted in FIG. 1, the accuracy of the unit 12 can be enhanced by including a temperature probe 36 for sensing the temperature of the roll 40 in the vicinity of the surface measurements made by the sensing elements 22 and 32 to compensate for thermal expansion resulting from temperature variations.

In view of the above, it can be seen that the portable unit 12, comprising the housing 14 and arm 16, is capable of having a rigid, compact and relatively lightweight construction. The unit 12 therefore can have a low profile and center of gravity, which equates to better balance when the unit 12 is in use, and therefore improved safety for the unit 12 and its operator. The rigidity of the housing 14 promotes the stiffness of the entire unit 12, such that the unit 12 has the mechanical integrity to support state-of-the-art electronics. As the unit 12 skates the roll 40 in the direction of its longitudinal axis, there is minimal extraneous mechanical motion to distort the electronic readings produced by the sensing elements 22 and 32.

The housing 14 is also capable of serving as an enclosure for data acquisition hardware 38 and a suitable power supply, such as a battery (not shown). FIG. 1 schematically represents the micrometer system 10 as including the computer 28, which is separate from and outside the housing 14. The computer 28 preferably utilizes dedicated software to process data stored by the data acquisition hardware 38 carried by the housing 14, and is preferably capable of representing the data on a screen 46. Any suitable communication device 48 can be used to connect the computer 28 to the data acquisition hardware 38 for transferring the data. In one embodiment, the device 48 is a cable, while in another embodiment the device 48 is a wireless module that allows data from the unit 12 to be transmitted to a remote location, such as where the computer 28 is a central terminal anywhere within the complex in which the measurements are being performed. According to another preferred aspect of the invention, the computer 28 is provided with touch screen icon-activated functions that are software-driven to receive and display pertinent data quickly, simply, and in a user format. The touch-screen computer 28 makes available to the operator an onscreen display of a roll profile skate, which can be projected over a target profile so the operator can see if a roll is within specifications.

In view of the above, the electronic micrometer system 10 of this invention provides many capabilities and advantages lacking in prior art caliper-type saddle micrometers. The portable unit 12 is able to accurately measure the diameter of a cylindrical body without the use of diametrically-opposed probes, such that the unit 12 is relatively compact and lightweight. In addition, the housing 14 provides a very rigid, low profile unit with a low center of gravity, improving the balance and handling of the portable unit 12. With the computing power of the computer 28, the options for the manipulation and presentation of data become essentially unlimited. Total roll management, including profiling, evaluation, history and inventory, also becomes practical with this invention. The data acquired can be set for different levels of access controlled by passwords (e.g., operator and management). The storage medium of the computer 28 can be readily sized to allow for individual user requirements and subsequent system refinements and upgrades. Using a wireless module as the communication device 48, data from multiple units 12 can be transmitted to a central terminal, where rolls can be evaluated at the corporate, plant site, roll shop, operator and/or grinder level. The inventory and life expectancy of rolls can be monitored, and the history of each roll tracked from the day it is put into service until the end of its useful life.

While the invention has been described in terms of particular embodiments, it is apparent that other forms could be adopted by one skilled in the art. Accordingly, the scope of the invention is to be limited only by the following claims.

What is claimed is:

1. An electronic profile acquisition micrometer system for sensing the diameter and variations in the diameter of a cylindrical body, the micrometer system comprising:

a housing;

means for supporting the housing on a surface of the cylindrical body while the cylindrical body is oriented so that its longitudinal axis is approximately horizontal;

an arm mounted to the housing and projecting outwardly therefrom in a lateral direction approximately perpendicular to the longitudinal axis of the cylindrical body;

first measurement means movably mounted to the arm so that the position of the first measurement means can be altered in a lateral direction approximately perpendicular to the longitudinal axis of the cylindrical body, the first measurement means being adapted for sensing a first surface point of the cylindrical body laterally spaced apart from the housing and disposed in a cross-sectional plane of the cylindrical body, the first surface point defining a terminal of a chord lying in the cross-section plane of the cylindrical body;

second measurement means mounted to the housing for contact with a second surface point of the cylindrical body disposed in the cross-sectional plane of the cylindrical body, the second surface point defining a location along the length of the chord; and means for determining the diameter of the cylindrical body based on the length and height of the chord ascertained from first and second outputs of the first and second measurement means, respectively.

2. The electronic profile acquisition micrometer system according to claim 1, wherein the housing is positioned on the cylindrical body while the cylindrical body is oriented so that the longitudinal axis of the cylindrical body is approximately horizontal, the second measurement means is positioned approximately top-dead-center on the cylindrical body and the chord is horizontal so that the second surface point locates the midpoint of the length of the chord, the length of the chord being ascertained by the position in the lateral direction of the first measurement means relative to the second measurement means.

3. The electronic profile acquisition micrometer system according to claim 1, wherein the determining means is programmed to calculate the diameter of the cylindrical body based on the formula $$d=(c^2+4h^2)/4h$$

where d is the diameter of the cylindrical body, c is the length of the chord, and h is the height of the chord.

4. The electronic profile acquisition micrometer system according to claim 1, wherein the determining means comprises:
   a computer outside the housing for calculating the diameter of the cylindrical body; and
   means for transmitting the first and second outputs to the computer.

5. The electronic profile acquisition micrometer system according to claim 1, wherein the support means enables the freestanding micrometer to travel along a longitudinal length of the cylindrical body.

6. The electronic profile acquisition micrometer system according to claim 5, wherein the support means comprises wheels supported by bearings, the wheels having axes of rotation oriented in a vertical direction when supporting the housing.

7. The electronic profile acquisition micrometer system according to claim 6, further comprising means for sensing a distance the freestanding micrometer travels along the longitudinal length of the cylindrical body.

8. The electronic profile acquisition micrometer system according to claim 7, further comprising means for determining a profile of the cylindrical body along the longitudinal length thereof based on changes in the diameter of the cylindrical body determined at different locations along the longitudinal length of the cylindrical body.

9. The electronic profile acquisition micrometer system according to claim 6, wherein the bearings having diameters larger than the diameters of the wheels.

10. An electronic profile acquisition micrometer system for sensing the diameter and variations in the diameter of a cylindrical body while the cylindrical body is oriented so that its longitudinal axis is approximately horizontal, the micrometer system comprising:
    a portable freestanding micrometer unit comprising:
      a housing;
      wheels mounted to the housing and adapted for supporting the housing on an upper surface of the cylindrical body while the cylindrical body is oriented so that the longitudinal axis thereof is approximately horizontal and the housing travels on the upper surface of the cylindrical body along a longitudinal length thereof;
      an arm mounted to the housing and projecting outwardly therefrom in a lateral direction approximately perpendicular to the longitudinal axis of the cylindrical body, the arm having graduations along a length thereof;
      first electronic linear measurement means for producing a first output signal, the first electronic linear measurement means being movably mounted to the arm so that the first electronic linear measurement means can be selectively positioned along the length of the arm with the graduations, the first electronic linear measurement means being adapted for contacting a first surface point of the cylindrical body when the first electronic linear measurement means is vertically displaced, the first surface point being laterally spaced apart from the housing and disposed in a cross-sectional plane of the cylindrical body, the first surface point defining a terminal of a horizontal chord lying in the cross-section plane of the cylindrical body; and
      second electronic linear measurement means for producing a second output signal, the second electronic linear measurement means being mounted to the housing for contacting a second surface point of the cylindrical body beneath the housing when the second electronic linear measurement means is vertically displaced, the second surface point being disposed in the cross-sectional plane of the cylindrical body and locating the midpoint of the length of the horizontal chord;
    data acquisition means for receiving the first and second output signals from the first and second electronic linear measurement means and storing the output signals as data;
    a computer separate from and outside the housing for receiving the data stored by the data acquisition means and calculating the diameter of the cylindrical body based on the length and height of the horizontal chord ascertained from the first and second output signals of the first and second electronic linear measurement means, the length of the horizontal chord being ascertained by the relative positions in the lateral direction of the first and second surface points sensed by the first and second electronic linear measurement means, the height of the horizontal chord being ascertained by the relative vertical positions of the first and second surface points sensed by the first and second electronic linear measurement means; and
    means for connecting the computer to the data acquisition means for transmitting the data.

11. The electronic profile acquisition micrometer system according to claim 10, wherein the computer is programmed to calculate the diameter of the cylindrical body based on the formula $$d=(c^2+4h^2)/4h$$

where d is the diameter of the cylindrical body, c is the length of the horizontal chord, and h is the height of the horizontal chord.

12. The electronic profile acquisition micrometer system according to claim 10, wherein the wheels are supported by bearings and have axes of rotation oriented in a vertical direction when supporting the housing.

13. The electronic profile acquisition micrometer system according to claim 10, further comprising means for sensing a distance the housing travels along the longitudinal length of the cylindrical body.

14. The electronic profile acquisition micrometer system according to claim 13, further comprising means for determining a profile of the cylindrical body along the longitudinal length thereof based on changes in the diameter of the cylindrical body continuously determined along the longitudinal length of the cylindrical body.

15. The electronic profile acquisition micrometer system according to claim 10, further comprising means for sensing a temperature of the cylindrical body adjacent at least one of the first and second surface points.

16. A method of determining the diameter of a cylindrical body, the method comprising the steps of:
    supporting a housing on a surface of the cylindrical body while the cylindrical body is oriented so that its longitudinal axis is approximately horizontal;
    positioning a first measurement means relative to the housing in a lateral direction approximately perpendicular to the longitudinal axis of the cylindrical body;

producing a first output signal with the first measurement means by sensing a first surface point of the cylindrical body laterally spaced apart from the housing and disposed in a cross-sectional plane of the cylindrical body, the first surface point defining a terminal of a chord lying in the cross-section plane of the cylindrical body;

producing a second output signal with a second measurement means by sensing a second surface point of the cylindrical body adjacent the housing and disposed in the cross-sectional plane of the cylindrical body, the second surface point defining a location along the length of the chord;

determining the diameter of the cylindrical body based on the length and height of the chord ascertained from the first and second output signals;

causing the housing to travel along a longitudinal length of the cylindrical body;

sensing a distance the housing travels along the longitudinal length of the cylindrical body; and determining a profile of the cylindrical body along the longitudinal length thereof based on changes in the diameter of the cylindrical body determined at different locations along the longitudinal length.

17. The method according to claim 16, wherein the housing is supported on an upper surface of the cylindrical body, the second measurement means is positioned approximately top-dead-center on the cylindrical body and the chord is horizontal so that the second surface point locates the midpoint of the length of the chord, the length of the chord is ascertained by the relative positions in the lateral direction of the first and second surface points sensed by the first and second measurement means, the height of the chord being ascertained by the relative vertical positions of the first and second surface points sensed by the first and second measurement means.

18. The method according to claim 16, wherein the diameter is determined with a computer program that calculates the diameter of the cylindrical body based on the formula $$d=(c^2+4h^2)/4h$$

where d is the diameter of the cylindrical body, c is the length of the chord, and h is the height of the chord.

19. The method according to claim 16, wherein the first and second output signals are transmitted from the housing to a computer outside the housing, and the computer calculates the diameter of the cylindrical body.

20. The method according to claim 16, further comprising the step of sensing a temperature of the cylindrical body.

* * * * *